June 23, 1964 R. W. NAVARRO ETAL 3,138,655
ELECTRICAL CABLE RETRACTOR WITH QUICK DISCONNECT HINGE
Filed April 24, 1962 2 Sheets-Sheet 1

INVENTORS
ROBERT W. NAVARRO
TED RAJEWSKI
BY
ATTORNEYS

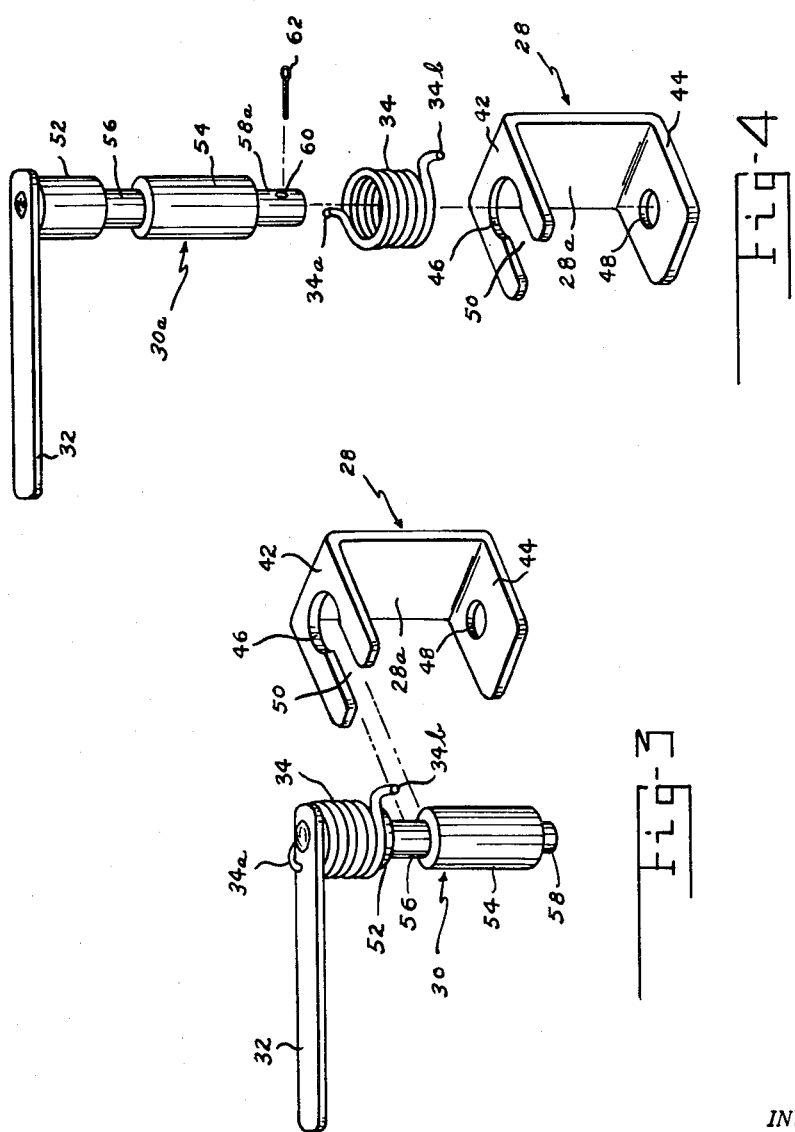

3,138,655
ELECTRICAL CABLE RETRACTOR WITH QUICK DISCONNECT HINGE

Robert W. Navarro, Cincinnati, Ohio, and Ted Rajewski, Richmond, Ind., assignors to the United States of America as represented by the Secretary of the Air Force
Filed Apr. 24, 1962, Ser. No. 189,937
2 Claims. (Cl. 174—69)

This invention relates to consoles housing electrical equipment and, more particularly, to the cable retractor used for supporting and guiding a cable for releasably connecting the electrical equipment in an individually removable drawer to the main wiring circuits within the console.

Whenever possible, it is customary and desirable to assemble electronic and electrical equipment into consoles. Such consoles provide the means for protecting the various components while at the same time allowing the components to be packaged into small, compact and self-contained subassemblies.

Consoles of the type contemplated by this invention use one or more drawer assemblies which slide in and out of the console in a manner much like desk or bureau drawers. Each drawer contains one or more subassemblies of components such as transformers, tubes, condensers, resistors, potentiometers, controls, dials, etc., properly wired to central terminal blocks containing sockets for connecting into the main wiring circuits at the rear of the console. Connection between the terminal blocks on the drawer subassemblies and the main wiring circuits may be by wire harness or cable leading from the main circuits and terminating in one or more connector blocks containing connector pins for engaging the sockets in the terminal blocks on the drawer subassemblies. The pin and socket connectors may be of any commercially available type such as Blue Ribbon Multi-Connectors and form no part of the present invention.

The wiring harness or cable between the main wiring circuits and the pin and socket multiconnectors must be long enough to permit the drawer being opened a sufficient amount for manually disconnecting the connector plug before the drawer assembly is removed from the console for repair, test, modification or other purpose. This necessary length of the harness results in a surplus length of cable when the drawer is fully closed. It is necessary to guide and control the location of the cable when in this position in order to prevent binding, twisting, and other damaging effects on the cable.

The means for controlling the cable may be in the form of a reel if the cable is of very small diameter and extremely flexible. A more simple and reliable method, and one equally useful with larger diameter and less flexible cables, is to provide a retractor made in accordance with the subject invention.

The primary object of this invention is to provide a cable retractor having optimum simplicity and reliability of operation.

Another object of this invention is to provide a cable retractor which reduces cable flexing to a minimum and to a single plane.

Still another object of this invention is to provide a cable retractor which supports both ends of the cable.

Yet another object of this invention is to provide a cable retractor having quick disconnect hinges.

Additional objects, advantages and features of the invention reside in the construction, arrangement and combination of parts involved in the embodiment of the invention as will appear from the following description and accompanying drawings, wherein:

FIG. 3 is an enlarged perspective of one embodiment of the quick disconnect hinge showing the manner in which the hinge is disconnected by lateral movement of the pin from the yoke.

FIG. 4 is an exploded perspective of another embodiment of the quick disconnect hinge.

Figures 1, 2:
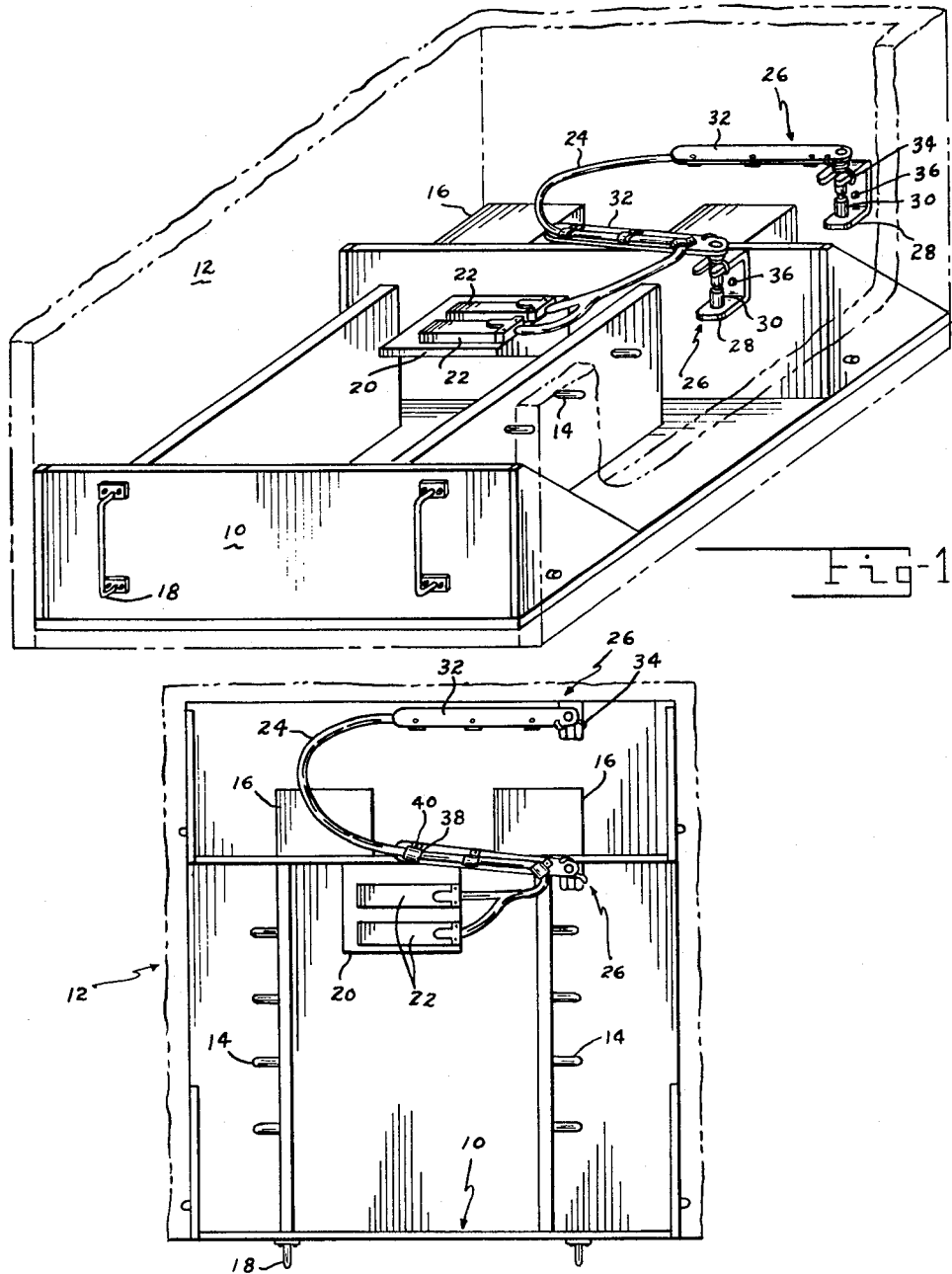
FIG. 1 is a schematic perspective of a typical drawer, containing electrical subassemblies, in the closed position within a console and showing a cable retractor with quick disconnect hinges supporting and guiding the cable.
FIG. 2 is a plan view of FIG. 1.

Referring to FIG. 1 and FIG. 2, a typical drawer 10 is shown in the closed or "home" position in a portion of console 12 which is shown in phantom. The drawer may be of any suitable construction to house the particular electrical equipment comprising the subassemblies within the drawer. Such equipment is represented by electronic tubes 14 and transformers 16. Suitable handles 18 are attached to the front of the drawer. If desired, a lock which is not shown may be provided to hold the drawer firmly in place or to prevent the unauthorized removal of the drawer from the console. The various components within the drawer are properly wired into necessary circuits which are not shown and do not constitute a necessary part of this invention. All wire leads from the subassemblies within the drawer, which must be joined to the main wiring circuits at the rear portion of the console, terminate in terminal blocks mounted to bracket 20. The terminal blocks are the female halves of commercially available and well know quick disconnect plugs and contain sockets for receiving the pins of the male halves 22 of the quick disconnect plugs. A harness of cable 24, in electrical communication with the main wring circuits, which are not shown and which do not constitute a part of this invention, terminates in the male halves 22 of the quick disconnect plugs.

The main components of the cable retractor comprise a pair of hinged, spring biased arm assemblies, one of which is joined to the drawer and the other of which is joined to the console. For purposes of illustration, on FIG. 1 and FIG. 2 both hinged arm assemblies are the same except for the direction of spring bias. An optional difference will be hereinafter described.

Again referring to FIG. 1 and FIG. 2, each hinged arm assembly 26 comprises essentially a yoke 28 which pivotally supports a removable pin 30 to which an arm 32 is joined, and a torsion spring 34 which biases the arm 32. The first hinged arm assembly 26 may be mounted to the drawer 10 as shown by screws 36 which pass through yoke 28. The vertical location is such as will permit the arm 32 and cable 24 to clear the drawer member to which joined. The second hinged arm assembly, in similar manner, is joined to the console as shown and in such relationship with the first hinged assembly as will place the two arms 32 in the same horizontal plane. The torsion spring 34 on the first hinged arm assembly biases arm 32 toward the front of the drawer and the torsion spring on the second hinged arm assembly biases the arm toward the rear of the console. If desired, suitable means, which are not a necessary part of this invention, may be provided to limit the travel of the arms in the biased direction.

Cable 24 may be joined to arms 32 by suitable brackets 38 which may be held in place by screws 40. As shown on FIG. 1 and FIG. 2, the cable is attached to the upper face of arm 32 of the first hinged arm assembly and to the lower face of the arm on the second assembly. The particular location of the cable on the arms may be selected to best meet the requirements of the particular application.

FIG. 3 illustrates enlarged details of one hinged arm assembly for use on this invention. Yoke 28, which may be made of flat sheet stock, has a back 28a, an upper ear 42 and a lower ear 44 in parallel spaced relationship at right angles to back 28a as shown. Coaxial and perpendicular to the ears are a first bore 46 in the upper ear 42 and a second and smaller diameter bore 48 in lower ear 44. The upper ear 42 is provided with a slot 50 communicating with bore 46 as shown. The slot is of any convenient width which is narrower than the diameter of bore 46. The slot 50 is shown as running between bore 46 and the front of ear 42, although it could be easily run to either side of the ear without departing from the invention.

Pin 30, to which arm 32 is riveted or otherwise joined to form a pivot arm, has four portions of varying diameter. At least the first portion 52 on one end of the pin and the second portion 58 on the other end of the pin are co-axial and of such diameter as will be properly journaled in bores 46 and 48 of yoke 28 when the pin and yoke are in the assembled position shown on FIG. 1. The first portion 52 of the pin is of such length as to have a portion extending outside the yoke for receiving torsion spring 34 when in the assembled position shown on FIG. 1. The third portion 56 of the pin is of such diameter as will conveniently pass through slot 50 of yoke 28. The fourth portion 54 of the pin is preferably somewhat larger in diameter than the first portion of the pin and of such length that the combined length of portions 54 and 58 is somewhat less than the distance between the ears on yoke 28. Torsion spring 34 is provided with a first hook 34a which engages arm 32 as shown on FIG. 3 and a second hook 34b which under torsion engages yoke 28 as shown on FIG. 1 and FIG. 2. It will be noted from FIG. 1 and FIG. 2 that a right hand and a left hand torsion spring 34 must be used since the arms 32 are rotationally biased in opposite directions.

In its assembled and operable position, the hinge is as shown on FIG. 1 with the second portion 58 of the pin engaging the bore in the lower ear 44 of the yoke 28, and with spring 34 hooked over the arm and the yoke. The hinge may be quick-disconnected by using a pair of pliers to unhook the spring from the yoke which will permit the arm with attached pin to be lifted until the top of the fourth portion 54 of the pin bottoms against ear 42, at which time the pin will be out of the bore in the lower ear of the yoke and may be removed by laterally sliding through slot 50.

The drawer 10 may be removed from console 12 by pulling it forward in the normal manner. As the drawer moves forward, carrying the attached hinged arm assembly with it, the arm moves in a clockwise direction while the arm of the hinged arm assembly joined to the console moves in a counterclockwise direction, and the cable 24 tends to straighten. After the drawer has been pulled forward a sufficient amount to provide access, the male halves 22 of the quick disconnect plugs are pulled and the hinged arm assembly on the drawer is disconnected in the manner above described. The cable is now completely severed from the drawer which may be removed from the console.

FIG. 4 illustrates another quick disconnect hinge having a modification over the embodiment shown on FIG. 3. Like parts and elements have like numbers and only the modification will be described below.

The second portion 58 of the pin 30 as shown on FIG. 3 is made longer as shown by 58a of pin 30a on FIG. 4. In that portion of the pin protruding through the lower ear 44 of yoke 28, a hole 60 is drilled for receiving a cotter pin 62, which is used as a safety measure or assurance that the hinge does not become disconnected because of spring failure or other reason. The cotter pin prevents axial movement of the pin in the yoke. Such a safety feature may be desirable on air borne consoles subjected to inertial, centrifugal and other forces. If desired, a spring clip may be substituted for the cotter pin. Likewise, if desired, the hole may be omitted and an external groove for receiving a snap ring may be substituted on the pin.

If desired, the quick disconnect feature of the hinge may be omitted from the hinge on the console. This would be done by omitting slot 50 from yoke 28 and omitting the third portion 56 from pin 30 in which case the portion 54 of the pin may be made contiguous with and of the same diameter as the 52 portion of the pin.

It is to be understood that the embodiment of the present invention as shown and described is to be regarded as illustrative only and that the invention is susceptible to variations, modifications and changes within the scope of the appended claims.

We claim:

1. In a console having one or more removable drawers housing electrical subassemblies connected into the main wiring circuits joined to the console by means of a cable terminating in at least one quick disconnect plug joined to said subassemblies, a cable retractor comprising: said cable, a first hinged arm assembly joined to the rear of said drawer and a second hinged arm assembly joined to the rear inside wall of said console, said first hinged arm assembly comprising a yoke joined to said drawer, a pin pivotally supported by said yoke, means on said yoke and said pin for permitting lateral detachment of said pin from said yoke, an arm attaching to and supporting and guiding the terminating end of said cable, said arm being joined to said pin for rotation with said pin, and a torsion spring surrounding a portion of said pin and having hooked ends one of which engages said yoke with the other end enaging said arm to bias said arm in the direction of said drawer while holding said pin in the operable position in said yoke, said second hinged arm assembly comprising a yoke joined to said console, a pin pivotally supported by said yoke, an arm attaching to and supporting and guiding the opposite end of said cable, said arm being joined to said pin for rotation with said pin, and a torsion spring surrounding a portion of said pin and having hooked ends one of which engages said yoke with the other end engaging said arm to bias said arm in the direction of said console wall.

2. In a console having one or more removable drawers housing electrical subassemblies connected into the main wiring circuits joined to the console by means of a cable terminating in at least one quick disconnect plug joined to said subassemblies, a cable retractor comprising: said cable, a first hinged arm assembly joined to the rear of said drawer and a second hinged arm assembly joined to the rear inside wall of said console, each of said hinged arm assemblies having a yoke, a pin pivotally supported by said yoke, means on said yoke and said pin for permitting lateral detachment of said pin from said yoke, an arm attaching to and supporting and guiding said cable, said arm being joined to said pin for rotation with said pin, and a torsion spring surrounding a portion of said pin and having hooked ends one of which engages said yoke with the other end engaging said arm to rotationally bias said arm and said pin while holding said pin in the operable position in said yoke.

References Cited in the file of this patent

UNITED STATES PATENTS

| | | |
|---|---|---|
| 1,484,372 | Edwards | Feb. 19, 1924 |
| 1,848,837 | Powers | Mar. 8, 1932 |
| 1,863,323 | Berne | June 14, 1932 |
| 2,253,700 | Graham | Aug. 26, 1941 |
| 2,684,498 | Zingone | July 27, 1954 |
| 2,865,979 | Klassen | Dec. 23, 1958 |